Oct. 23, 1934.    C. A. NORGREN    1,977,917
HOSE COUPLING
Filed May 9, 1932
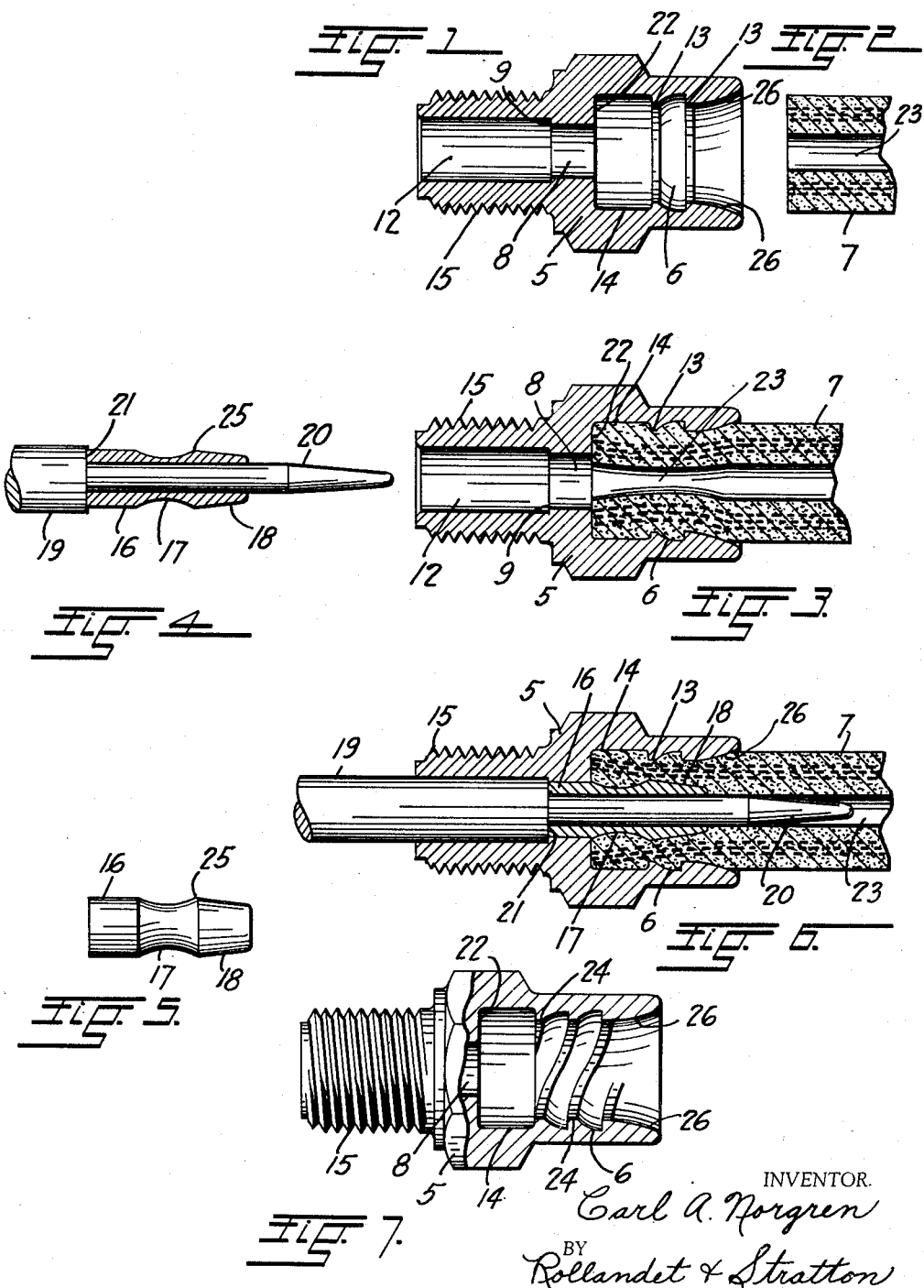
INVENTOR.
Carl A. Norgren
BY
Rollandet & Stratton
ATTORNEYS Patented Oct. 23, 1934

1,977,917

UNITED STATES PATENT OFFICE 1,977,917

HOSE COUPLING

Carl A. Norgren, Denver, Colo.

Application May 9, 1932, Serial No. 610,073

3 Claims. (Cl. 285—84)

This invention relates to hose couplings and more particularly to a method and means for attaching a metal coupling-member to a flexible tube, such as a rubber hose.

It is an object of the invention to provide simple means to effect a joint between the hose and the coupling whereby they are permanently fixed against relative displacement.

The invention is of particular value in connection with resilient hose of small interior diameter, since it avoids restriction of the hose diameter and assures a full and uniform opening throughout the coupling and the hose.

With these and other objects in mind, the coupling comprises two cooperative members providing recesses for the exterior and interior expansion of the wall of the hose, the inner member having a bore corresponding in diameter with the interior of the hose.

An embodiment of the invention is shown in the accompanying drawing in the several views of which like parts are similarly designated and in which Figure 1 is a sectional view of the outer coupling member, Figure 2, a similar view of an end of a hose to which the coupling is to be applied, Figure 3, a sectional view of the parts shown in Figures 1 and 2, after the coupling member has been applied to the hose, Figure 4, a sectional view of the inner coupling member, in position on a tool used for inserting it into the hose, Figure 5, an elevation of the inner coupling member, Figure 6, a sectional elevation of the two coupling members in their cooperative relation to the hose after the joint is completed, the tool for inserting the inner member being shown ready for withdrawal, and Figure 7, a sectional elevation showing a modified construction of the outer coupling-member.

The outer coupling member 5 has a chamber 6 to receive the end-portion of the hose 7 and in axial alinement with the chamber, a bore 8 which is shouldered as at 9 to provide an enlarged outer portion 12 into which, in practice, the tool used in applying the inner-coupling member, is inserted.

The chamber 6 has interiorly, annular barbs 13 to frictionally engage with the outer surface of the hose, and it has at its inner end an enlargement providing a recess 14 for the outward expansion of the wall of the hose.

The member 5, as shown in the drawing, has an exterior screw thread 15 for its connection with another member or device having a corresponding interior screw thread, and it will be understood that the present invention applies to female coupling members as well as to male coupling members of the character shown in the drawing.

The inner coupling member 16 consists of a tubular ferrule, the interior diameter corresponding with that of the hose.

The ferrule has an exterior annular depression providing a recess 17 for the inward expansion of the wall of the hose. It is tapered at one end as at 18, to facilitate its insertion in the hose.

The tool for inserting the ferrule into the hose has at the end of a stem or shank 19, a pointed finger 20 of reduced diameter, which has a sliding fit with the interior of the ferrule. The shoulder 21 formed at the juncture of the shank with the finger in practice is engaged by an end of the ferrule and it is sufficiently wide to also engage the shoulder 9 in the outer coupling-member.

In order to apply the coupling to the hose, the latter is forcibly inserted into the chamber 6 of the outer coupling member until it engages the breast 22 of the same, as shown in Figure 3 of the drawing. The annular bars project into the chamber and are of less diameter than the hose which fits inside the chamber, so that when the hose is inserted in the chamber the barbs press into the wall of the hose and cause it to expand inwardly, as indicated at 23 in Figure 3. The sides of the barbs facing the open end of the coupling member through which the hose is inserted, slant outwardly, and the barb nearest the said end slants to the same, as at 26, to facilitate the movement of the hose into the chamber.

The barbs instead of being of annular form may be of spiral form, as shown at 24 in Figure 7, in which case the coupling member is placed over the hose by a rotary movement of the same.

After the outer coupling member is placed upon the hose, as shown in Figure 3, the inner coupling member or ferrule is inserted into the hose by means of the tool.

The ferrule is exteriorly proportioned for a compression or press fit with the bore of the outer member between its shoulder and the breast of the chamber, and it is desirable to use a mechanical pressure device acting upon the tool to forcibly insert the ferrule into the hose as shown in Figure 6.

The pointed end of the ferrule adjacent the annular depression is slightly enlarged, as at 25, and when the ferrule is in place, this enlargement is opposite to the innermost barb of the outer coupling member adjacent the recess.

This position of the ferrule is predetermined by the engagement of the shoulder 21 of the tool with the shoulder 9 of the bore of the outer member, it being understood that the stem of the tool has a sliding fit with the enlarged portion 12 of the said bore.

When the ferrule is thus forcibly entered into the bore of the hose, its enlarged portion 25 engaging the restricted part 23 of the wall of the same, opposite the barbs, presses the said part of the wall outwardly and exerts a terrific expansive force which causes the elastic wall to expand outwardly into the spaces around the barbs and into the recess 14, while by retro-action it expands inwardly into the recess 17 of the ferrule. The expansion being thus balanced inwardly and outwardly there is no tendency to force the coupling members and the hose apart, neither does the elastic material at the bore of the hose move ahead of the tool or the ferrule as they are inserted in the hose.

By reason of the fact that the grip on the hose is comparatively short in length as compared with the depth of the bore, there is but slight displacement of the material in the wall of the hose, said displacement being balanced both forward and rearward into the recess and the flaring outer end 26 of the chamber of the coupling member.

When the tool is withdrawn, there is no inward contraction of the wall of the hose at the inner end of the ferrule, and inasmuch as the interior diameter of the ferrule equals that of the hose, there is a smooth, uniform and continuous opening throughout the coupling and the hose.

The expansion of the hose-wall oppositely into the recesses 14 and 17 and around the barbs 13 provides a positive lock forming a permanent connection which cannot be broken, either accidentally or mechanically without destruction of one or more of the parts constituting the assembly.

What I claim and desire to secure by Letters Patent is:

1. A hose coupling comprising a member having a chamber to receive an end-portion of a flexible hose, having a recess at the inner end of the chamber, and having a bore axially alined with the chamber, the bore having a shoulder-forming enlargement, and a tubular member fitted in said bore and extending into the hose, with one end substantially flush with the shoulder of the bore, said second member having a recess opposite that of the chamber, the surface of the tubular member outside the recess, being smooth for the ready entrance of the member into the hose.

2. A hose coupling comprising a member having a chamber to receive an end-portion of a flexible hose, having a recess at the inner end of the chamber, and having a bore axially alined with the chamber, and a tubular member fitted in said bore and adapted for insertion in the hose, said tubular member having a recess opposite to that of the chambered member.

3. A hose-coupling comprising a member having a chamber, the circumferential surface of which has barbs and a recess exclusive of the barbs, and having a bore alined with the chamber, a flexible hose in the chamber, and a tubular member fitted in the bore and extending in the hose, said tubular member having a recess opposite to that of the chamber, into which the hose is expanded.

CARL A. NORGREN.